United States Patent
Aono et al.

(10) Patent No.: US 10,530,948 B2
(45) Date of Patent: Jan. 7, 2020

(54) IMAGE FORMING APPARATUS

(71) Applicant: CANON KABUSHIKI KAISHA, Tokyo (JP)

(72) Inventors: Kazuhiko Aono, Numazu (JP); Kazushi Suzuki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/127,053

(22) Filed: Sep. 10, 2018

(65) Prior Publication Data

US 2019/0098156 A1 Mar. 28, 2019

(30) Foreign Application Priority Data

Sep. 25, 2017 (JP) ................. 2017-183412

(51) Int. Cl.
*H04N 1/00* (2006.01)
*G03G 15/00* (2006.01)

(52) U.S. Cl.
CPC ..... *H04N 1/00543* (2013.01); *G03G 15/6529* (2013.01); *H04N 1/00572* (2013.01); *H04N 1/00631* (2013.01)

(58) Field of Classification Search
CPC .. B65H 2301/4212; B65H 2405/11151; B65H 2405/114; B65H 2601/321; B65H 2601/325; B65H 29/52; B65H 31/02; B65H 31/26; B65H 2402/10; B65H 29/58; B65H 3/44; G03G 15/6552; G03G 15/6508; G03G 21/1619; G03G 21/1647; G03G 2215/00383; G03G 2215/0054
USPC ...................................... 358/498, 1, 15, 496
See application file for complete search history.

(56) References Cited

U.S. PATENT DOCUMENTS

| | | | |
|---|---|---|---|
| 2005/0085988 A1* | 4/2005 | Ushiroda | B60K 17/346 701/80 |
| 2009/0062998 A1* | 3/2009 | Ushiroda | B60W 10/119 701/69 |
| 2016/0200541 A1* | 7/2016 | Kuroki | B65H 31/26 271/207 |
| 2018/0120726 A1* | 5/2018 | Aono | B65H 3/5261 |

FOREIGN PATENT DOCUMENTS

| | | |
|---|---|---|
| JP | 2001109210 A | 4/2001 |
| JP | 2005154022 A | 6/2005 |
| JP | 2013003448 A | 1/2013 |

* cited by examiner

*Primary Examiner* — Negussie Worku
(74) *Attorney, Agent, or Firm* — Canon U.S.A., Inc. IP Division (57) ABSTRACT

An image forming apparatus, including an image forming unit to form an image on a recording medium, includes a storage unit storing the recording medium and disposed to be drawable toward a front side of the image forming apparatus, a first stacking unit, an image reading unit disposed at an image forming apparatus upper portion, a document stacking unit disposed above the first stacking unit and at an image reading unit front side, and a second stacking unit. The first stacking unit stacks the recording medium having the image and which is discharged toward the front side. The image reading unit reads an image formed on a document having the image formed thereon in advance. The document stacking unit stacks the document. The second stacking unit stacks the document having the image read by the image reading unit and which is discharged toward an image reading unit back side.

10 Claims, 8 Drawing Sheets

IMAGE FORMING APPARATUS

BACKGROUND OF THE INVENTION

Field of the Invention

The present disclosure relates to an electrophotographic image forming apparatus, such as a copier or a laser beam printer, which includes an image reading unit.

Description of the Related Art

Heretofore, there have been two types of image forming apparatuses, i.e., a front-access-type image forming apparatus having a structure in which a discharge tray for discharging recording paper having an image formed thereon faces the front side of the image forming apparatus, and a side-access-type image forming apparatus having a structure in which the discharge tray is directed in a lateral direction. In the front-access-type image forming apparatus, a cassette and a multi-tray, on each of which recording paper is set, are disposed at the front side of the image forming apparatus, and thus the front-access-type image forming apparatus is advantageous in usability.

An example of an image forming apparatus that allows reading of an image formed on a document and formation of an image on recording paper is an image forming apparatus which includes an auto document feeder (ADF) and has a structure in which an image reading unit capable of skimming through documents is disposed at an upper portion of the apparatus. Specifically, as discussed in Japanese Patent Application Laid-Open Nos. 2005-154022, 2001-109210, and 2013-3448, an image reading unit is disposed at an upper portion of an image forming apparatus. Such an image forming apparatus has a structure in which a document feed tray faces the back side of the apparatus and a document discharge tray faces the front side of the apparatus, or a structure in which a recording paper discharge tray of the image forming apparatus is also used as the document discharge tray. The image forming apparatus also has a structure in which the recording paper discharge tray is disposed at an upper portion of the image forming apparatus and an image reading apparatus is disposed so as to cover an upper portion of the recording paper discharge tray. In other cases, the image forming apparatus has a structure in which a sheet feed tray is disposed above a discharge tray, the discharge tray is also used as a discharge tray for discharging recording paper and documents, and the sheet feed tray is also used as a sheet feed tray for feeding recording paper and documents.

However, normal operations required for a user, such as setting of recording paper or documents and adjustment for regulation of an end position, are mainly carried out in a sheet feed unit. The image forming apparatus of the related art which includes the image reading unit disposed at an upper portion of the image forming apparatus is disadvantageous in usability for the following reasons.

Since the document feed tray is disposed at the back side of the image forming apparatus, the sheet feed unit is far from the user who is at the front of the apparatus, which may lead to a deterioration in the operability for setting a document. Further, when the document discharge tray faces the same direction as the recording paper discharge tray, there is a concern that the recording paper discharge tray may be hidden by the discharged document. Furthermore, when the recording paper discharge tray is also used as the document discharge tray, there is a concern that documents and recording paper may be mixed on the tray. Also, when the sheet feed tray and the discharge tray are used for stacking both of recording paper and documents, there is a concern that documents and recording paper may be mixed on each tray.

SUMMARY OF THE INVENTION

The present disclosure is directed to improving the operability for setting a document and also improving the visibility of discharged recording paper and the operability for taking out a discharged document.

According to an aspect of the present invention, an image forming apparatus, including an image forming unit configured to form an image on a recording medium, includes a storage unit disposed to be drawable toward a front side of the image forming apparatus and configured to store the recording medium, a first stacking unit configured to stack the recording medium on which the image is formed by the image forming unit and which is discharged toward the front side, an image reading unit disposed at an upper portion of the image forming apparatus and configured to read an image formed on a document having the image formed thereon in advance, a document stacking unit disposed above the first stacking unit and at a front side of the image reading unit and configured to stack the document, and a second stacking unit configured to stack the document on which the image is formed by the image forming unit and is read by the image reading unit and which is discharged toward a back side of the image reading unit.

Further features of the present invention will become apparent from the following description of embodiments with reference to the attached drawings.

DESCRIPTION OF THE EMBODIMENTS

Embodiments of the present disclosure will be described in detail with reference to the drawings. However, dimensions, materials, shapes, and relative arrangements of components described in the following embodiments should be appropriately modified depending on the structures or various conditions of apparatuses to which the present disclosure is applied. Therefore, the scope of the present disclosure is not intended to be limited to the following embodiments, unless otherwise specified.

(Overall Structure of Image Forming Apparatus)

Figure 1:
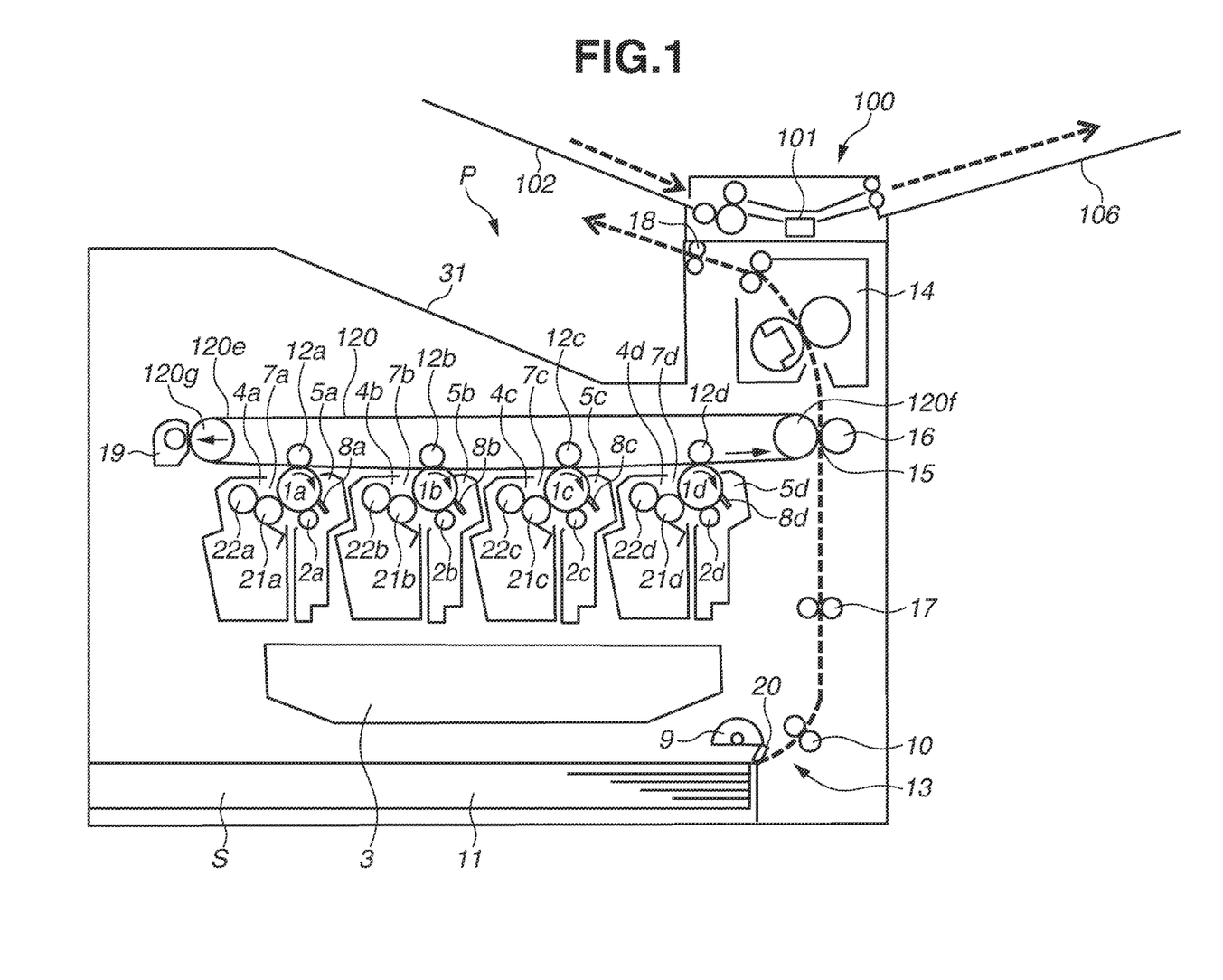
FIG. 1 is a main sectional view of an image forming apparatus according to a first embodiment.
Figure 2:
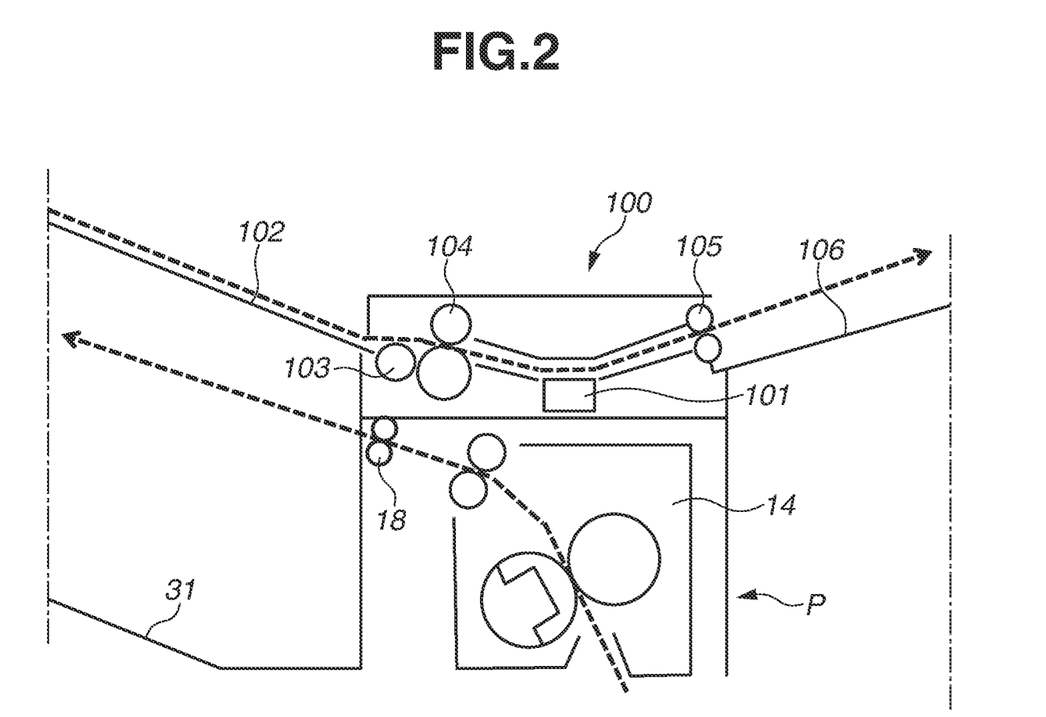
FIG. 2 is an enlarged sectional view of an image reading apparatus according to a second embodiment.

FIG. 1 is a main sectional view of an overall structure of an image forming apparatus P. FIG. 2 is an enlarged sectional view of an image reading apparatus 100 of the image forming apparatus P.

The image forming apparatus P includes four photosensitive drums 1 (1a, 1b, 1c, 1d) as image bearing members. Charging rollers 2 (2a, 2b, 2c, 2d), development units 4 (4a, 4b, 4c, 4d), and cleaning blades 8 (8a, 8b, 8c, 8d), which are process units acting on the respective photosensitive drums 1, are disposed around the respective photosensitive drums 1. Further, a laser scanner 3, which is an optical unit, and primary transfer rollers 12 (12a, 12b, 12c, 12d) are disposed around the respective photosensitive drums 1. These components constitute an image forming unit that forms an image on a recording medium S such as recording paper.

In the present embodiment, the photosensitive drum 1 and the process units including the charging roller (charging unit) 2, the development unit 4, and the cleaning blade (cleaning unit) 8, are integrally formed as a process cartridge 7. The process cartridges 7 (7a to 7d) are each detachably attached to the image forming apparatus P.

The four process cartridges 7a, 7b, 7c, and 7d have the same structure, but use toner of different colors, i.e., yellow (Y), magenta (M), cyan (C), and black (Bk), respectively, for image formation. Hereinafter, the components common to each color, such as the process cartridges 7a, 7b, 7c, and 7d, are collectively referred to as the process cartridge 7 so as to indicate each of the process cartridges.

The process cartridge 7 (7a, 7b, 7c, 7d) includes the development unit 4 (4a, 4b, 4c, 4d) and a cleaner unit 5 (5a, 5b, 5c, 5d). The development unit 4 includes a development roller 21, a developer applying roller 22, and a toner container. The cleaner unit 5 includes the photosensitive drum 1, serving as an image bearing member, the charging roller 2, the cleaning blade 8, and a waste toner container.

Both ends of the photosensitive drum 1, serving as an image bearing member, is rotationally supported by a flange. A drive force is transmitted from a drive motor (not illustrated) to one end of the photosensitive drum 1 so that the photosensitive drum 1 is to be rotationally driven clockwise as indicated by an arrow in FIG. 1.

The charging roller (charging unit) 2 is a conductive roller formed in a roller shape. The charging roller 2 comes into contact with the surface of the photosensitive drum 1, and uses a power supply (not illustrated) to apply a charging bias voltage to the surface of the photosensitive drum 1 so that the surface of the photosensitive drum 1 is to be uniformly charged.

The laser scanner 3, serving as an optical unit (exposure unit), is disposed vertically below the process cartridge 7, and irradiates the photosensitive drum 1 with light for exposure based on an image signal.

The development units 4a, 4b, 4c, and 4d include toner containers which contain toner of yellow (Y), magenta (M), cyan (C), and black (Bk), respectively. The development unit 4 also includes the development roller 21 which is adjacent to the surface of the photosensitive drum 1 and is rotationally driven by a drive unit (not illustrated). A development bias voltage is applied to the development roller 21 by a development bias power supply (not illustrated) so that the development roller performs development. The developer applying roller 22 supplies the development roller 21 with the toner contained in the toner container.

In an intermediate transfer body unit 120, an intermediate transfer belt 120e is stretched over a drive roller 120f and a tension roller 120g and the tension roller 120g applies a tension in a direction indicated by an arrow in FIG. 1. The primary transfer rollers 12a, 12b, 12c, and 12d are disposed so as to face the photosensitive drums 1a, 1b, 1c, and 1d, respectively, at the inside of the intermediate transfer belt 120e. A transfer bias is applied to the primary transfer roller 12 by a bias application unit (not illustrated).

Toner images formed on the photosensitive drum 1 are sequentially primarily transferred onto the intermediate transfer belt 120e, which is rotated in a direction indicated by an arrow in FIG. 1, in order from the toner image formed on the photosensitive drum 1a by application of a positive polarity bias to the primary transfer roller 12. The four color superimposed toner images formed on the intermediate transfer belt 120e are conveyed to a secondary transfer unit 15.

A sheet feed cassette 11, which is a storage unit that contains the recording medium S as a recording medium having no image formed thereon, is disposed at a lower portion of the image forming apparatus P. Examples of a recording medium having no image formed thereon include a blank sheet and a transparent sheet. The sheet feed cassette (storage unit) 11 is disposed in such a manner that the sheet feed cassette 11 can be drawn out leftward (to a front side of the image forming apparatus P) in FIG. 1. A user draws out the sheet feed cassette (storage unit) 11 from an apparatus main body and detaches the sheet feed cassette 11 from the apparatus main body. After that, the user sets the recording medium S in the sheet feed cassette 11 and inserts the sheet feed cassette 11 into the apparatus main body. In this way, the supply of the recording medium is completed.

A sheet feed unit 13 includes a sheet feed roller 9 that feeds the recording medium S from the inside of the sheet feed cassette (storage unit) 11, and a conveyance roller pair 10 that conveys the fed recording medium S. The recording medium S, such as recording paper, which is contained in the sheet feed cassette 11, is brought into pressure contact with the sheet feed roller 9 and separated one by one by a separating pad 20 and then conveyed by the conveyance roller pair 10. The recording medium S conveyed from the sheet feed unit 13 is conveyed to the secondary transfer unit 15 by a registration roller pair 17.

In the secondary transfer unit 15, a positive polarity bias is applied to a secondary transfer roller 16 so that the four color toner images formed on the intermediate transfer belt 120e are to be collectively secondarily transferred onto the conveyed recording medium S.

A fixing unit 14 applies heat and pressure to an image (toner image) transferred onto the recording medium S, to thereby fix the image onto the recording medium S. The recording medium S onto which the image is fixed is discharged to a discharge tray 31 by a discharge roller pair 18. The discharge tray 31 is a first stacking unit on which the recording medium S, which has an image formed thereon by the image forming unit and is discharged toward the front side (leftward in FIG. 1) of the image forming apparatus P, is stacked.

After the transfer of the toner image, toner remaining on the surface of the photosensitive drum 1 is removed by the cleaning blade 8, and the removed toner is collected into the waste toner container provided in the cleaner unit 5.

The toner remaining on the intermediate transfer belt 120e after the secondary transfer onto the recording medium S is removed by a transfer belt cleaning device 19, and the removed toner passes through a waste toner conveyance path (not illustrated) and is collected into a waste toner collecting container (not illustrated).

(First Embodiment)

An image forming apparatus including an image reading apparatus according to a first embodiment will be described with reference to FIGS. 1 and 2. A structure for feeding and discharging a document and a structure for reading an image in the image reading apparatus will be described below.

The image reading apparatus 100 that reads an image formed on a document is disposed at an upper portion of the image forming apparatus P. The term "document" used herein refers to an object on which an image, such as text, a drawing, a picture, or the like is formed in advance. The image reading apparatus 100 includes an image reading unit 101 that reads an image formed on a document. When the image reading apparatus 100 including the image reading unit 101 is viewed in a gravitational direction, the fixing unit 14 overlaps the secondary transfer unit 15 which is a part of the image forming unit.

In the image reading apparatus 100, a document feed tray 102, serving as a document stacking unit that stacks documents each having an image to be read, is disposed above the discharge tray 31 and at the front side of the image forming apparatus P relative to the image reading unit 101. In the image reading apparatus 100, a document discharge tray 106, serving as a second stacking unit that stacks documents to be discharged toward the back side of the image reading unit 101 after the images formed on the documents are read by the image reading unit 101, is disposed at the back side (right side in FIG. 1) of the image forming apparatus P relative to the image reading unit. Further, in the image reading apparatus 100, a document feed roller 103, serving as a document feed unit that feeds the documents stacked on the document feed tray 102 to the image reading unit 101 from the front side of the image forming apparatus P, and a document registration roller 104 that conveys the documents toward the image reading unit 101 are disposed. Furthermore, in the image reading apparatus 100, a document discharge roller pair 105, serving as a document discharge unit that discharges the document having an image already read by the image reading unit 101 to the document discharge tray 106 located at the back side (right side in FIG. 1), is disposed.

In the case of reading images formed on documents, the documents stacked on the document feed tray (document stacking unit) 102 are separated one by one by the document feed roller (document feed unit) 103 and are fed to the document registration roller 104. Further, the documents are conveyed to the image reading unit 101 by the document registration roller 104, and the images formed on the documents are read by the image reading unit 101. As the image reading unit 101, a contact image sensor (CIS) is used. The documents each having an image already read by the image reading unit 101 are discharged onto the document discharge tray 106 by the document discharge roller pair 105 and are then stacked on the document discharge tray 106. Data on the image read by the image reading unit 101 is stored in a computer on a network as electronic data, or is converted into print data by a control unit (not illustrated) and is copied to a new recording medium.

The document feed tray (document stacking unit) 102 is disposed above the discharge tray (first stacking unit) 31 and at the front side of the image reading unit 101. The document discharge tray (second stacking unit) 106 is disposed at the back side of the image reading unit 101. In this manner, the document feed tray 102 is disposed above the discharge tray 31 and at the front side of the image forming apparatus P so that the operability for setting a document having an image to be read can be improved. In addition, the document discharge tray 106 is disposed at the back side of the image forming apparatus P so that the recording medium discharged onto the discharge tray 31 is not hidden by the document discharged onto the document discharge tray 106. Consequently, the visibility of the recording medium discharged onto the discharge tray 31 and the operability for taking out the discharged recording medium can be improved.

(Second Embodiment)

Figure 3:
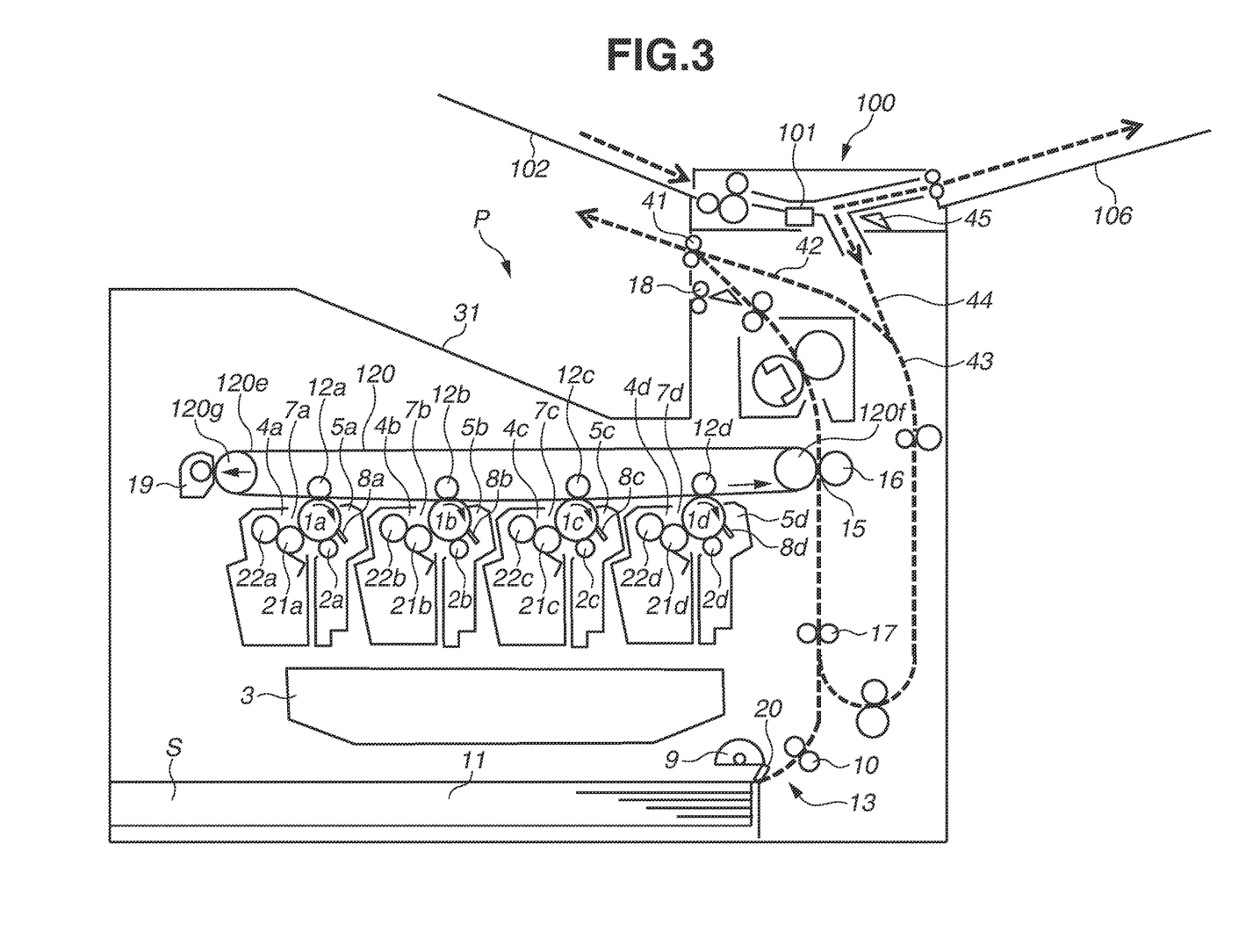
FIG. 3 is a main sectional view of an image forming apparatus according to the second embodiment.
Figure 4:
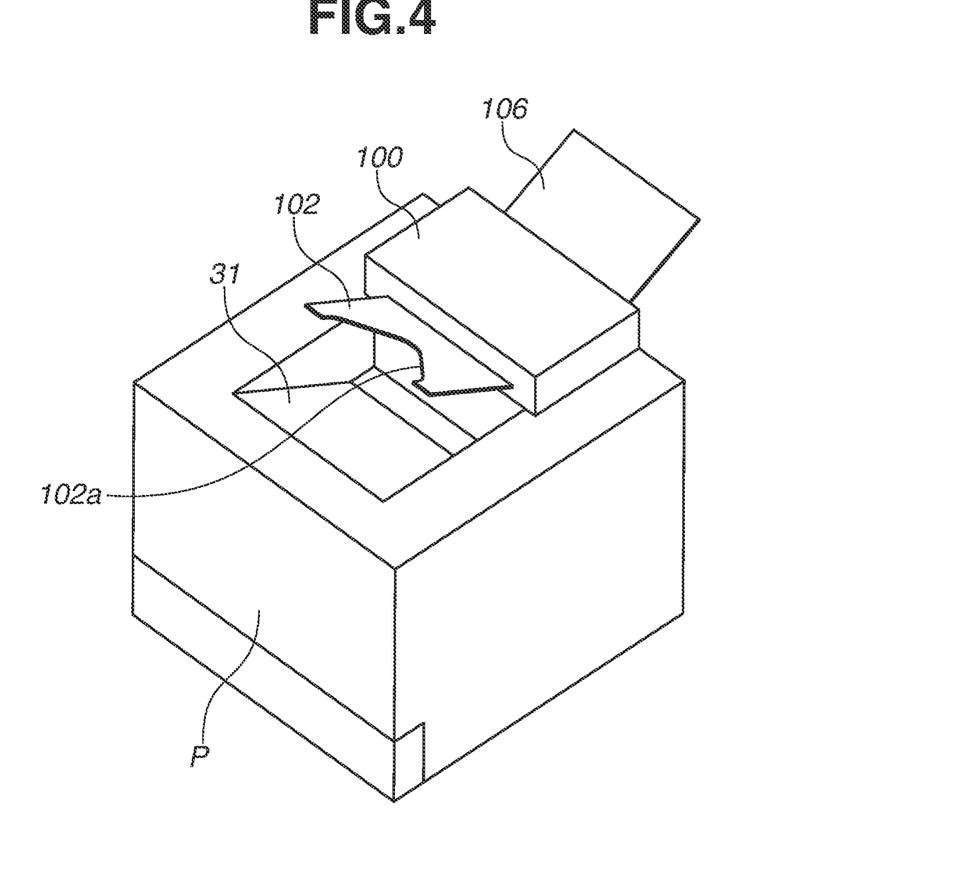
FIG. 4 is a perspective view of the image forming apparatus according to the second embodiment.
Figure 5:
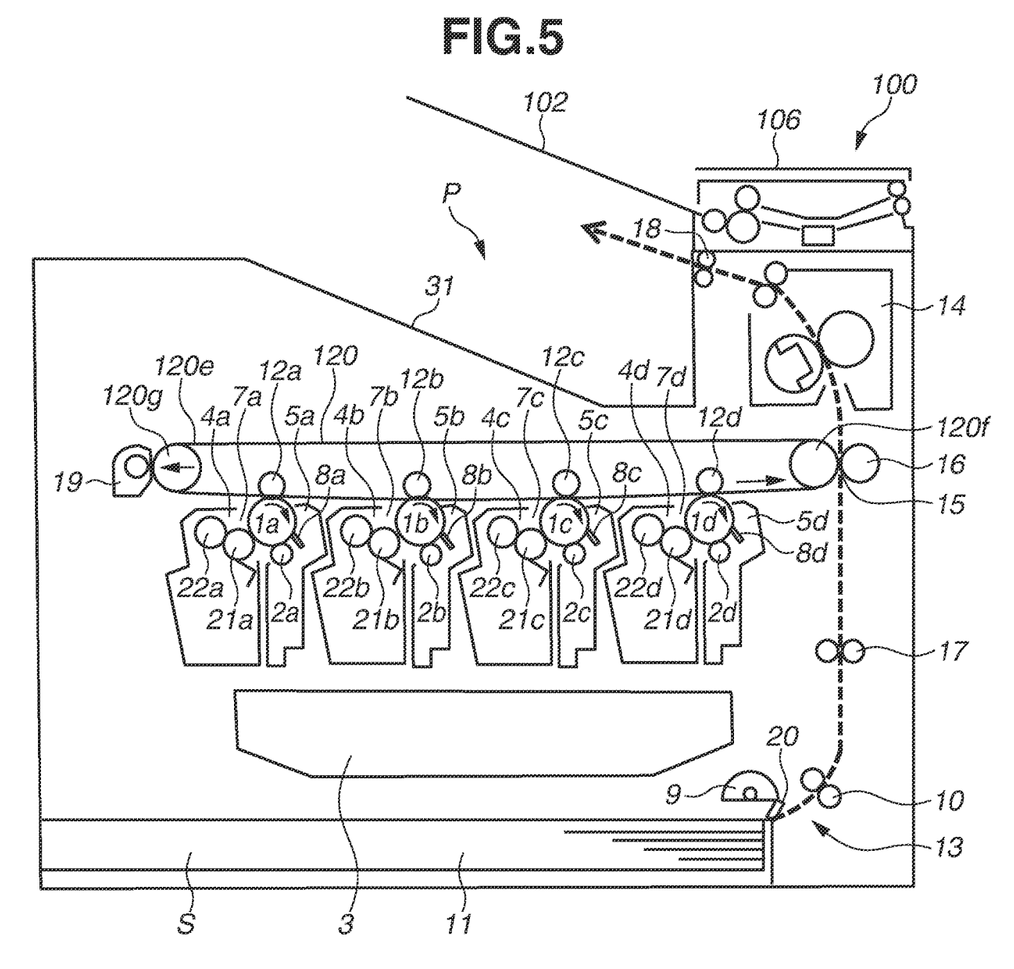
FIG. 5 is a main sectional view of the image forming apparatus according to the second embodiment.

An image forming apparatus including an image reading apparatus according to a second embodiment will be described with reference to FIGS. 3, 4, and 5. Components of the image forming apparatus according to the second embodiment that are the same as those of the image forming apparatus according to the first embodiment are denoted by the same reference numerals, and descriptions thereof are omitted. FIG. 3 is a main sectional view illustrating an overall structure of the image forming apparatus P according to the present embodiment. FIG. 4 is a perspective view of the image forming apparatus P according to the present embodiment. FIG. 5 is a main sectional view of the image forming apparatus P according to the present embodiment.

As illustrated in FIG. 3, the image forming apparatus P includes a reverse roller 41, a reverse conveyance path 42 that reverses and conveys the recording medium having an image formed thereon by the image forming unit, and a double-sided conveyance path 43 that conveys the reversed recording medium to the image forming unit again. The reverse roller 41 conveys the recording medium S onto which the image is fixed by the fixing unit 14 to the reverse conveyance path 42, and the recording medium S is then conveyed to the image forming unit again through the double-sided conveyance path 43. The image forming unit forms an image on the other surface (back surface) of the recording medium having an image already formed on one surface (front surface) thereof so that the images can be formed on both the front and back surfaces of the recording medium.

The image forming apparatus P also includes a merge conveyance path 44 that conveys a document having an image already read by the image reading unit to the double-sided conveyance path 43. The image forming apparatus P also includes a switching flapper (switching unit) 45 which is configured to be switchable to selectively guide a document having an image already read by the image reading unit to one of the merge conveyance path 44 and the document discharge tray 106. In the image reading apparatus 100, a document having an image already read by the image reading unit 101 is guided to the merge conveyance path 44 and the double-sided conveyance path 43 by the switching flapper (switching unit) 45, and is then conveyed to the image forming unit. This structure allows the image forming unit to form an image on a document having an image already read.

As illustrated in FIG. 4, a notch 102*a* is formed at a central portion of the document feed tray 102 of the image reading apparatus 100. In this case, the document feed tray 102 is provided with a V-shaped opening as the notch 102*a*. The notch 102*a* is not limited to the V-shaped opening, but instead may be any opening, such as a U-shaped opening, as long as the opening is opened at the front side of the image forming apparatus. With this structure, the visibility of the recording medium stacked on the discharge tray (first stacking unit) 31 and the operability for taking out the discharged recording medium can be improved.

As illustrated in FIG. 5, the document discharge tray (second stacking unit) 106 is disposed to be rotatable with respect to the image forming apparatus P and can be folded so as not to project from a bottom portion area of the image forming apparatus P as viewed in the gravitational direction. With this structure, the size of the entire apparatus can be reduced in a state where the image reading apparatus is not being used (in an unused state).

(Third Embodiment)

Figure 6:
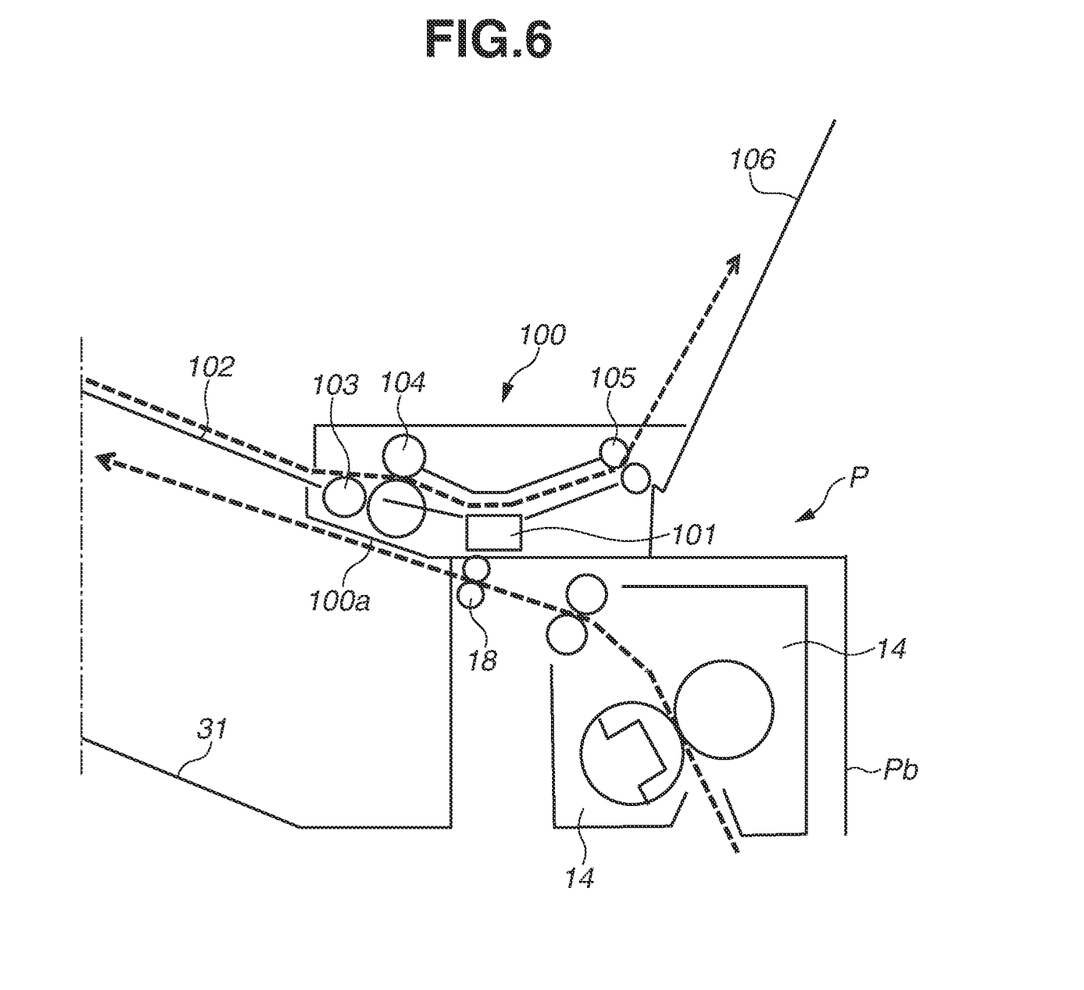
FIG. 6 is an enlarged sectional view of an image reading apparatus according to a third embodiment.

An image forming apparatus including an image reading apparatus according to a third embodiment will be described with reference to FIG. 6. Components of the image forming apparatus according to the third embodiment that are the same as those of the image forming apparatus according to the first embodiment are denoted by the same reference numerals, and descriptions thereof are omitted. FIG. 6 is an enlarged sectional view of the image reading apparatus 100 according to the present embodiment.

As illustrated in FIG. 6, in the image forming apparatus P according to the present embodiment, the document discharge tray (second stacking unit) 106 is not projecting from the bottom portion area of the image forming apparatus P as viewed in the gravitational direction. Specifically, the image reading apparatus 100 is shifted forward and a bottom surface 100a of the image reading apparatus 100 is set as a sheet passing surface for a recording medium to be discharged from the image forming apparatus P. With this structure, the document discharge tray 106 does not project from a back surface Pb of the image forming apparatus P, and then, an increase in the occupied volume of the image forming apparatus can be suppressed.

(Fourth Embodiment)

Figure 7:
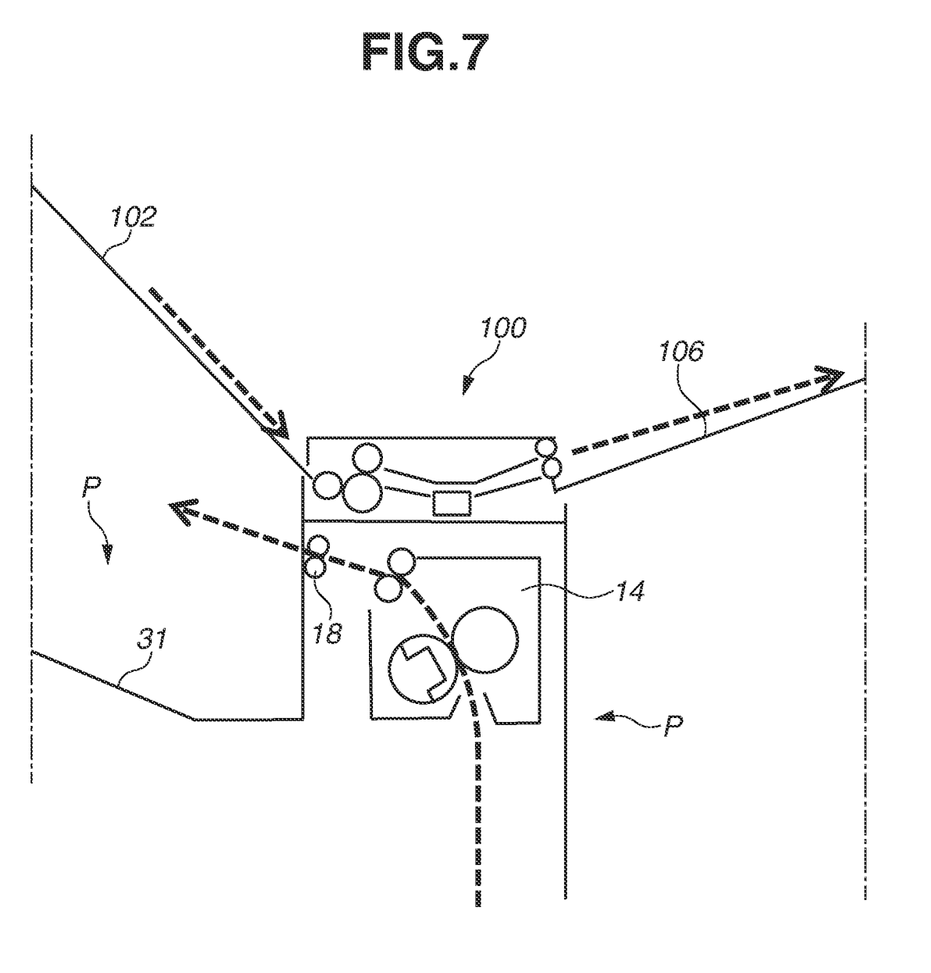
FIG. 7 is an enlarged sectional view of an image reading apparatus according to a fourth embodiment.

An image forming apparatus including an image reading apparatus according to a fourth embodiment will be described with reference to FIG. 7. Components of the image forming apparatus according to the fourth embodiment that are the same as those of the image forming apparatus according to the first embodiment are denoted by the same reference numerals, and descriptions thereof are omitted. FIG. 7 is an enlarged sectional view of the image reading apparatus 100 according to the present embodiment.

As illustrated in FIG. 7, the document feed tray (document stacking unit) 102 is disposed so as to be inclined with respect to the discharge tray (second stacking unit) 31 so that the interval between the discharge tray 31 and the document feed tray 102 increases toward the front side of the image forming apparatus P. In this way, since the document feed tray 102 is inclined with respect to the discharge tray 31, the visibility and accessibility of the recording medium stacked on the discharge tray 31 can be improved.

(Fifth Embodiment)

Figure 8:
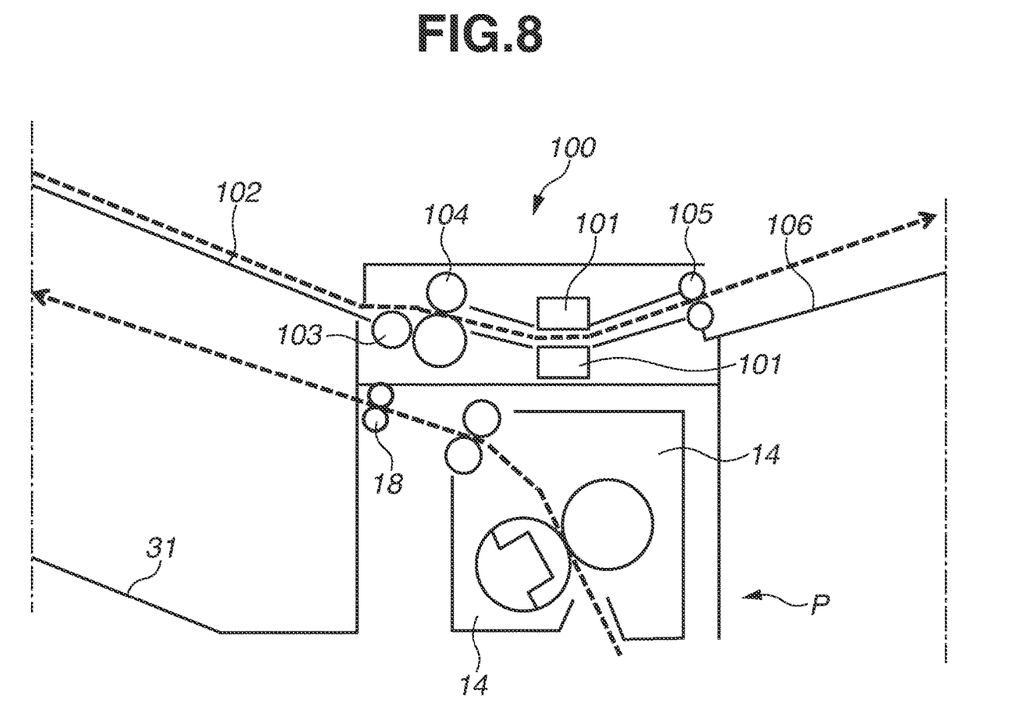
FIG. 8 is an enlarged sectional view of an image reading apparatus according to a fifth embodiment.

An image forming apparatus including an image reading apparatus according to a fifth embodiment will be described with reference to FIG. 8. Components of the image forming apparatus according to the fifth embodiment that are the same as those of the image forming apparatus according to the first embodiment are denoted by the same reference numerals, and descriptions thereof are omitted. FIG. 8 is an enlarged sectional view of the image reading apparatus 100 according to the present embodiment.

As illustrated in FIG. 8, the image reading unit 101 includes a first image reading unit 101 and a second image reading unit 101. In the case of reading images formed on a document, the first image reading unit 101 and the second image reading unit 101 are disposed vertically with the document interposed therebetween. With this structure, images formed on both the front and back surfaces of a document can be simultaneously read.

While modified examples have been described above in the second to fifth embodiments, these embodiments may be combined as other embodiments.

One example may be an image forming apparatus which includes the first image reading unit and the second image reading unit, each of which is included in the image reading unit 101 according to the fifth embodiment, and also includes the merge conveyance path 44 capable of conveying a document having an image already read by the image reading unit of the second embodiment as illustrated in FIG. 3. This image forming apparatus further includes a switching unit which is configured to be switchable to selectively guide a document having an image already read by the image reading unit to one of the merge conveyance path 44 and the document discharge unit.

Another example is an image forming apparatus which includes an image reading apparatus having an inclined bottom surface as illustrated in FIG. 6 according to the third embodiment, and a plurality of image reading units according to the fifth embodiment.

According to the present disclosure, the operability for setting a document having an image to be read can be improved, and the visibility of a discharged recording medium and the operability for taking out the discharged recording medium can also be improved.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-183412, filed Sep. 25, 2017, which is hereby incorporated by reference herein in its entirety.

What is claimed is:

1. An image forming apparatus comprising:
   an image forming unit configured to form an image on a recording medium;
   a storage unit disposed to be drawable toward a front side of the image forming apparatus and configured to store the recording medium;
   a recording medium stacking unit configured to stack the recording medium on which an image is formed by the image forming unit and which is discharged toward the front side;
   an image reading unit disposed at an upper portion of the image forming apparatus and configured to read an image formed on a document having the image formed thereon in advance;
   a first document stacking unit disposed above the recording medium stacking unit and at a front side of the image reading unit, and is configured to stack the document which is supplied to the image reading unit; and
   a second document stacking unit disposed at a back side of the image reading unit and configured to stack the document which is discharged from the image reading unit.

2. The image forming apparatus according to claim 1, further comprising:
   a merge conveyance path capable of conveying the document having the image read by the image reading unit; and
   a switching unit configured to be switchable to selectively guide the document having the image read by the image reading unit to the merge conveyance path and the second document stacking unit.

3. The image forming apparatus according to claim 1, further comprising:
   a reverse conveyance path configured to reverse and convey the recording medium having the image formed thereon by the image forming unit; and a double-sided conveyance path configured to convey the recording medium reversed by the reverse conveyance path to the image forming unit again.

4. The image forming apparatus according to claim 1, wherein the first document stacking unit has a notch.

5. The image forming apparatus according to claim 4, wherein the first document stacking unit has an opening opened at the front side of the image forming apparatus.

6. The image forming apparatus according to claim 1,
wherein the second document stacking unit is disposed to be rotatable with respect to the image forming apparatus, and
wherein, while the second document stacking unit is not being used, the second document stacking unit is not projecting from a bottom portion area of the image forming apparatus as viewed in a gravitational direction.

7. The image forming apparatus according to claim 1, wherein the second document stacking unit is not projecting from a bottom portion area of the image forming apparatus as viewed in a gravitational direction.

8. The image forming apparatus according to claim 7, wherein an interval between the recording medium stacking unit and the first document stacking unit increases toward the front side of the image forming apparatus.

9. The image forming apparatus according to claim 1,
wherein the image reading unit includes a first image reading unit and a second image reading unit, and
wherein, in a case where the image formed on the document is read, the first image reading unit and the second image reading unit are disposed vertically with the document interposed between the first image reading unit and the second image reading unit.

10. The image forming apparatus according to claim 1,
wherein an image reading apparatus including the image reading unit overlaps a fixing unit and a secondary transfer unit as viewed in a gravitational direction, and
wherein the secondary transfer unit is a part of the image forming unit.

* * * * *